May 30, 1961 G. D. JOHNSON ET AL 2,985,988
UNIVERSAL GRINDING MACHINE
Filed July 13, 1959 7 Sheets-Sheet 1

Fig.1

INVENTORS
Glenn D. Johnson
BY Cyrus S. Yingst

Attorney

May 30, 1961 G. D. JOHNSON ET AL 2,985,988
UNIVERSAL GRINDING MACHINE
Filed July 13, 1959 7 Sheets-Sheet 2

INVENTORS
Glenn D. Johnson
BY Cyrus S. Yingst
Norman S. Blodgett
Attorney

May 30, 1961　　　G. D. JOHNSON ET AL　　　2,985,988
UNIVERSAL GRINDING MACHINE

Filed July 13, 1959　　　　　　　　　　　　　7 Sheets-Sheet 3

INVENTORS
Glenn D. Johnson
BY Cyrus S. Yingst

Norman S. Blodgett
Attorney

May 30, 1961 G. D. JOHNSON ET AL 2,985,988
UNIVERSAL GRINDING MACHINE
Filed July 13, 1959 7 Sheets-Sheet 4

INVENTORS
Glenn D. Johnson
Cyrus S. Yingst
BY
Norman L. Blodgett
Attorney

May 30, 1961

G. D. JOHNSON ET AL

2,985,988

UNIVERSAL GRINDING MACHINE

Filed July 13, 1959

INVENTORS
Glenn D. Johnson
BY Cyrus S. Yingst

Norman L. Blodgett
Attorney

Fig. 16

INVENTORS
Glenn D. Johnson
Cyrus S. Yingst

United States Patent Office 2,985,988
Patented May 30, 1961

2,985,988
UNIVERSAL GRINDING MACHINE
Glenn D. Johnson, Holden, and Cyrus S. Yingst, West Boylston, Mass., assignors to The Heald Machine Company, Worcester, Mass., a corporation of Delaware
Filed July 13, 1959, Ser. No. 826,595
23 Claims. (Cl. 51—50)

This invention relates to a universal grinding machine and more particularly to apparatus arranged to grind internal and external cylindrical surfaces as well as flat surfaces.

Universal grinding machines have been used for many years in tool rooms and the like where it is necessary to provide a grinding machine which, although not capable of production manufacture, is capable of doing any one of a large number of grinding operations. These machines are usually capable of either internal or external grinding and of accomplishing flat surface grinding also. However, universal grinding machines of this type have had a number of limitations. There has been a considerable amount of friction in the wheelhead ways which has limited the operation of the machine. A number of the elements, particularly the wheelhead table cylinders, have been costly to manufacture, thus making the overall machine quite expensive. Difficulty has been experienced in the workhead in that it has been possible, when the wheelhead has been recently adjusted, that considerable tension remains in the adjusting screw and, when vibrations are introduced during grinding, the table "jumps" a small distance to relieve the screw tension. This introduces inaccuracies in the finished work. Furthermore, the arrangements for removing the wheel guard during grinding has been less that satisfactory. Also, because of the unsatisfactory nature of the wheelhead ways it has been necessary to use a power-assisted hand table traverse, which is expensive and subject to maintenance problems. These and other difficulties experienced with the prior art devices have been obviated in a novel manner by the present invention.

It is, therefore, an outstanding object of the invention to provide a universal grinding machine of simple, yet rugged construction which is capable of a long life of useful service.

Another object of this invention is the provision of a universal grinding machine having an automatically retractable guard for the wheel.

A further object of the present invention is the provision of a universal grinder having an unusual arrangement of traverse and feed ways, which ways make use of a hydrostatic lubricating system.

It is another object of the instant invention to provide a universal grinding machine having a hydrostatic way lubricating system with a novel apparatus for metering oil.

It is a further object of the invention to provide a universal grinding machine having a novel manner of lubricating the ways, providing substantially frictionless sliding of the elements, and thus permitting a simple and inexpensive hand traversing arrangement.

A still further object of this invention is the provision of a universal grinding machine having an unusual construction of wheelhead table actuating cylinders with a built-in damping mechanism.

It is a still further object of the present invention to provide a universal grinding machine having a system for relieving tension in the adjusting feed screw on the workhead table after adjustment of the table has been made.

Another object of the invention is the provision of a universal grinding machine in which the hydraulic valving is mounted in an unusual manner on the front external surface of the machine, thus making them readily accessible and reducing inaccuracies because of heating on the interior of the machine.

To the accomplishment of the foregoing and related ends, the invention, then, comprises the features hereinafter fully described and particularly pointed out in the claims, the following description and the annexed drawings setting forth in detail an illustrative embodiment of the invention; this being indicative, however, of but one of the various ways in which the principles of the invention may be employed.

For the purposes of the present specification the expression "longitudinal" shall be used to indicate the direction of the axis of the wheel, while the expression "transverse" will be used to indicate a direction at a right angle to the axis of the wheel.

Figure 1:
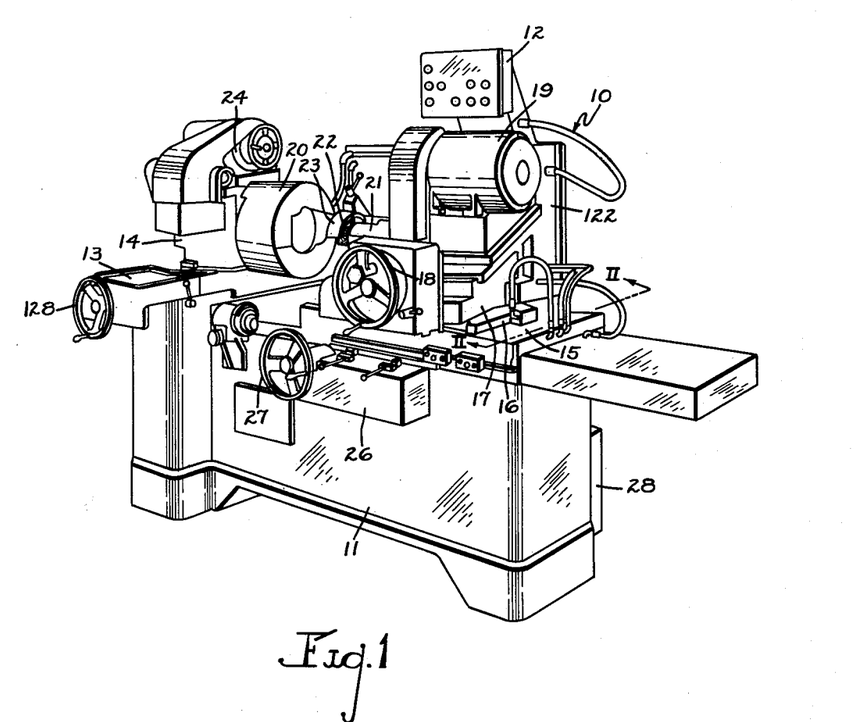
Fig. 1 is a perspective view of a universal grinding machine embodying the principles of the present invention.

Referring to Fig. 1, wherein are best shown the general features of the invention, the grinding machine, indicated generally by the reference numeral 10, is shown as consisting of a base 11 having an electrical control box 12 mounted at the rear side thereof. At one end of the base is mounted the workhead table 13 on which is mounted the workhead 14. Overlying the other end of the base 11 is a wheelhead table 15 on top of which is mounted a bottom slide 16 on which, in turn, is mounted a top slide 17. At the front of the top slide 17 is mounted a feed box 18 and on top of the top slide 17 is mounted a wheelhead motor 19. Also mounted on the top slide is a wheelhead 21 carrying an abrasive wheel 22. A wheel guard 23 is associated with the wheel and is mounted on the top slide 17. Mounted on the workhead 14 is a workhead drive motor 24 and a chuck guard 20. At the front part of the base is mounted a valve box 26 at one end of which is located a wheelhead table reciprocating hand wheel 27. At the rear of the base 11 is mounted the hydraulic pressure unit 28.

Figure 2:
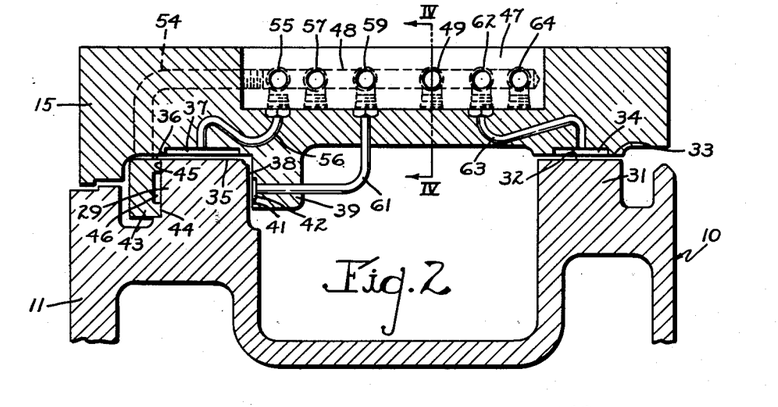
Fig. 2 is a sectional view of the invention taken on the line II—II of Fig. 1.
Figures 3, 4, 5:
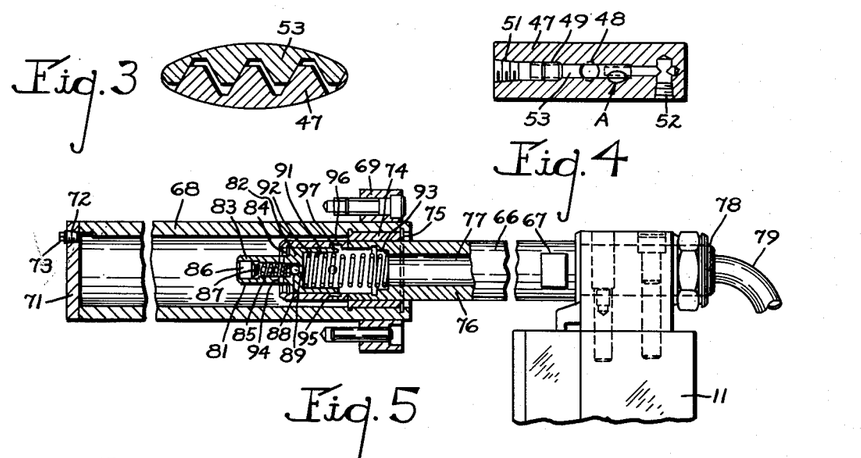
Fig. 3 is an enlarged sectional view of a portion of a metering screw.
Fig. 4 is a sectional view of the invention taken on the line IV—IV of Fig. 2.
Fig. 5 is an elevational view with portions in section of a cylinder used in the apparatus of the invention.

In Fig. 2 it can be seen the manner in which the wheelhead table 15 is supported on the base 11 so as to present a minimum of frictional resistance to longitudinal motion thereover. The base 11 is provided with two longitudinal rails 29 and 31. The rail 31 is provided with an absolutely flat horizontal upper surface 32, overlying which is a downwardly-depending longitudinal abutment 33 having a shallow pocket 34 formed therein. The rail 29 is provided with a flat horizontal upper surface 35 which is opposed by a similar flat horizontal surface 36 forming a lower surface of the wheelhead table 15 and provided with a shallow pocket 37. The rail 29 is provided with a vertical flat surface 38 facing inwardly of the machine and facing this surface is a longitudinal rail 39 having a similar flat vertical surface 41 formed with a shallow pocket 42. Also mounted on the under surface of the wheelhead table 15 is a rail 43 having an inwardly-facing smooth vertical surface 44 which mates with a corresponding surface 45 found in the outer surface of the rail 29; the surface 44 has a shallow pocket 46 formed therein. Mounted at one end of the wheelhead table and readily accessible for adjustment is a manifold block 47 having a transverse bore 48 extending therethrough. As is most evident in Fig. 4, a number of longitudinal passages 49 intersect the transverse bore 48 and extend at right angles thereto. At its outer end each bore is provided with a threaded pipe socket 51 for the attachment of a hydraulic line. At its outer end each passage 49 connects with another pipe socket 52 by which it is attached to a lubricating area. Occupying a considerable portion of the length of each passage 49 and extending on both sides of the bore 48 is a screw element 53. This screw is engaged with similar threads in the passage 49 and is provided with a socket head at its end which is closest adjacent to the pipe fitting 51 to permit adjustment from the outside. Fig. 3 shows the small portion of the block 47 and the screw 53 and the manner of the cooperation of the mating threads. When the screw is drawn up tightly, the threads contact on one side, but not on the other. It can be seen from Fig. 3 that there is a small passage between the portions of the threads which are not in contact and this space is appreciable although, of course, it will be understood that it is somewhat magnified in Fig. 3 for the purposes of clarity. This passage is used as an orifice in the hydraulic system. One end of the bore 48 is connected by a passage 54 to the pocket 46 formed in the rail 43. A passage 55 is connected by a conduit 56 to the pocket 57 in the surface 36. One of the transverse passages 55 is connected by a conduit 56 to the pocket 37 in the surface 36. A second such passage 57 is connected by a conduit 58 to a similar pocket aligned with the pocket 37. A third such passage 59 is connected by a conduit 61 to the pocket 42 in the rail 39 as well as to a similar pocket in a rail aligned with the rail 39. The passage 49 is connected to the source of hydraulic fluid, as will be more fully described hereinafter. The passage 62 is connected by a conduit 63 to the pocket 34 formed on the abutment 33. The passage 64 is similarly connected by a conduit 65 to a pocket on an abutment located in alignment with the abutment 33.

Underlying the central portion of the wheelhead table 15 adjacent the right hand end thereof is a hydraulic linear actuator 66 having a piston rod 67 which is bolted to the base 11 and a cylinder 68 which is fastened to the under side of the table 15 by means of a collar 69. One end of the cylinder 68 is normally closed off by a cap 71 welded to the tubular body of the cylinder 68, the cap having a small opening 72 normally closed by a pipe plug 73. At the piston rod end the cylinder is provided with a bronze bushing 74 locked in a counter-bore by means of a snap ring 75. The bushing 74 fits smoothly around the main body 76 of the piston rod 67. The main body 76 of the piston rod is provided with a bore 77 extending therethrough opening at the end which fastens to the base 11 and provided at that end with a pipe fitting 78 for attachment to a conduit 79 leading to a source of hydraulic fluid. In the bore 77 at the end of the piston rod 67 which is within the cylinder 68 is located a small piston 81 having an enlarged portion 82 which resides within the bore 77 and a relatively thinner portion 83 which generally lies externally of the bore and projects toward the cap 71. The piston is prevented from leaving the piston rod 67 by means of a snap ring 84 which engages the shoulder at one end of the large portion 82. A small portion 83 is provided with a bore 85 extending axially therethrough and closed at one end by a plug 86. A coil spring 87 lies within the bore 85 and this spring presses a ball 88 against a conical shoulder leading into a small passage 89 which opens into a large bore 91 entering the other end of the piston 81. A coil spring 92 lies within the bore 91 and presses against a shoulder 93 formed in the bore 77. A small passage 94 leads radially outwardly of the bore 85 of the small portion 83. An annular groove 95 is formed in the wall of the bore 77 adjacent the inner end of the piston 81 and small radial passages 96 lead outwardly of the piston rod from this annular passage into the interior of the cylinder. The side of the enlarged portion 82 of the piston 81 is provided with a flat 97 at the edge of the skirt immediately adjacent the annular groove 95. In its normal position, as shown in Fig. 5, the end of the piston is adjacent one side of the annular groove 95 and almost completely covers the groove; a small portion which can be visualized as an annular flow passage is left exposed. This condition exists when the enlarged portion 82 rests against the snap ring 84, but, when the piston has been pressed inwardly of the piston rod against the force of the spring 92, the piston completely covers the annular groove 95 with the exception of a small portion left open because of the presence of the flat 97.

Figure 6:
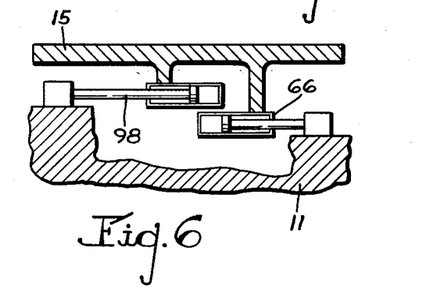
Fig. 6 is a schemmatic view of the wheelhead table of the invention showing two cylinders in place.

In Fig. 6 the wheelhead table 15 is shown in longitudinal section in association with the base 11 with the hydraulic linear actuator 66 connected to an abutment of the table and a hydraulic linear actuator 98 connecting the base to another part of the table, the two pistons operating in opposition.

Figure 7:
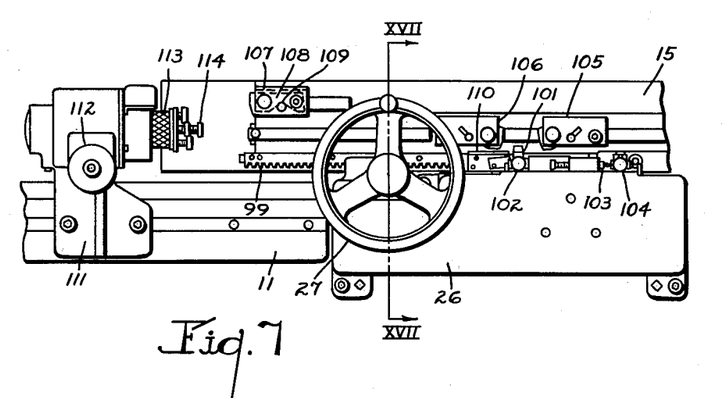
Fig. 7 is an enlarged view of a portion of the control box of the invention.

Referring now to Fig. 7, which shows table control box 26 and associated equipment, it can be seen that a rack 99 is bolted to the front edge of the wheelhead table 15 and is used in conjunction with the hand wheel 27, as will be described more fully hereinafter. Now, on top of the valve box 26 is a reverse lever 101 and a table lever 102 as well as an adjustable grinding stop 103 and a throttle lever 104. On the table 15 overlying the box 26 are table dogs 105 and 106 and a stop dog 107 with a latch 108 and a latch knob 109. A lift lever 110 is mounted on the top of the box 26. Also adjustably positioned on the upper front portion of the base 11 is a facing attachment 111 having a facing knob 112 and a barrel 113; a series of stop screws 114 extend from the barrel.

Figure 8:
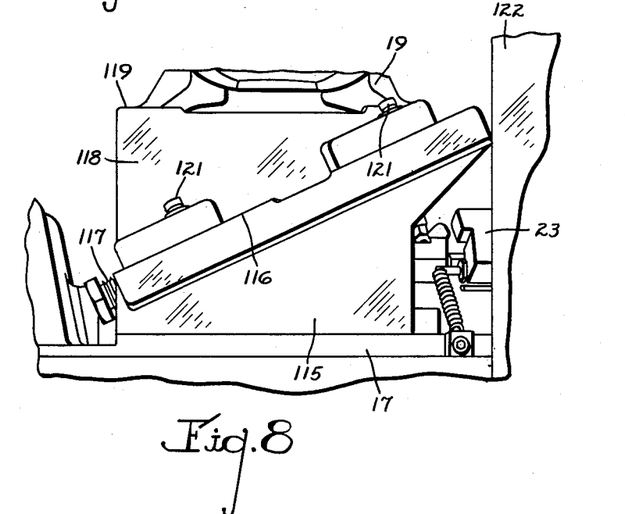
Fig. 8 is an enlarged view of a portion of the end of the machine showing a wheelhead motor mount.
Figure 9:
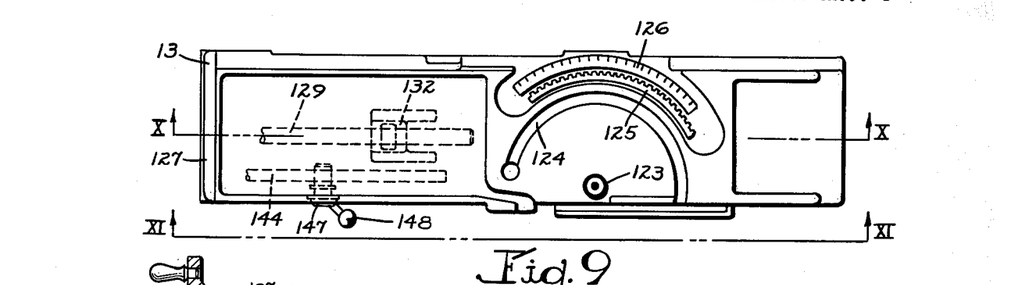
Fig. 9 is a plan view of the workhead table with the workhead removed.
Figure 10:
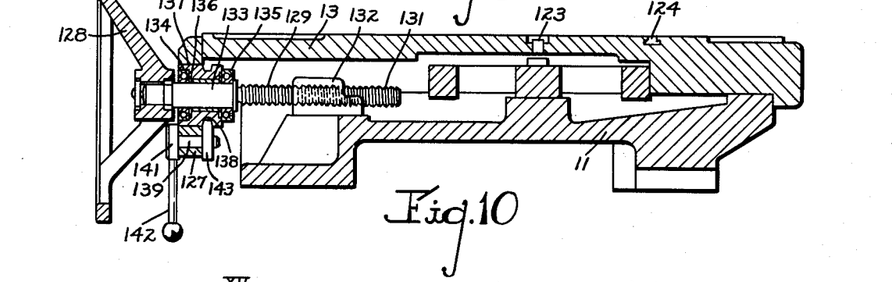
Fig. 10 is a sectional view of the invention taken on the line X—X of Fig. 9.
Figure 11:
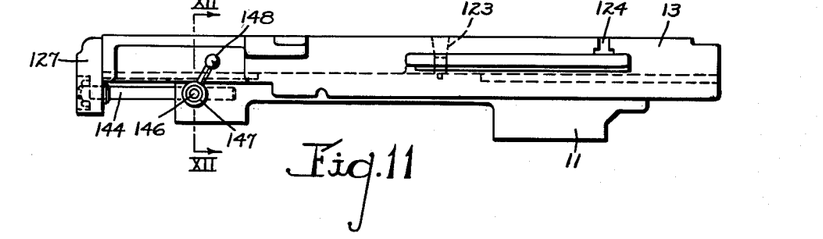
Fig. 11 is a sectional view of the invention taken on the line XI—XI of Fig. 9.
Figure 12:
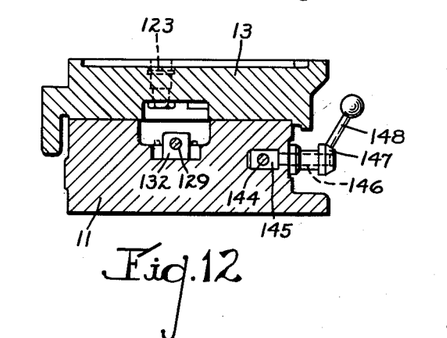
Fig. 12 is a sectional view of the invention taken on the line XII—XII of Fig. 11.

Referring now to Fig. 8, which is an end view of the machine showing the mounting of the wheelhead motor 19, it can be seen that the top slide 17 is provided with an abutment 115 having an inclined surface 116 on which the motor 19 is mounted. A belt tension adjusting screw 117 is mounted in the lower edge and is brought to bear against a transition block 118. The transition block 118 has a lower inclined surface which lies against the inclined surface 116 of the abutment 115 and an upper horizontal surface 119 on which the motor 19 is mounted. Suitable clamp screws 121 serve to fasten the transition block 118 to the abutment 115 after the belt tension adjustment has been made by means of a screw 117. At the right side of Fig. 8 can be seen the supporting control column 122 of the electrical control box 12. This view also shows, in the space between the abutment 115 and the control column 122, portions of the wheel guard 23.

Figs. 9, 10, 11 and 12 show the details of construction of the workhead cross slide 13. The cross slide is an elongated rectangular member, as is evident in Fig. 9, which is shown in the drawings with the workhead 14 removed and which is mounted for transverse sliding movement on the base 11. The cross slide is provided with a pivot aperture 123 by which the workhead 14 may be pivotally attached to its upper surface; also provided is a T-slot 124 which is concentric with the pivot aperture 123 and aids in retaining the workhead firmly attached to the upper surface of the cross slide. A segmental rack 125 and a concentric scale 126 permit angular adjustment of the workhead relative to the slide. At the end of the cross slide which is at the front of the grinding machine is located an apron 127 in front of which is mounted a cross slide hand wheel 128. The hand wheel is mounted on an extending end of a feed screw 129 which has a threaded portion 131 extending through a nut 132 which is bolted to a suitable portion of the base 11. The feed screw 129 is also provided with a non-threaded portion 133 which is mounted in ball bearings 134 and 135, the outer races of which are attached to a bushing 136. The bushing 136 is provided with a cylindrical outer surface and is slidably mounted in a bore 137 passing through the apron 127; the hand wheel 128 is, of course, keyed and fastened to the outer end of the non-threaded portion 133 of the feed screw 129. The outer surface of the bushing 136 is also provided with a V-groove 138. Now, passing through the lower portion of the apron 127 is a small shaft 139 which extends outwardly from the apron on the front side of the machine and has keyed thereto a hub 141 from which extends an actuating handle 142. The shaft 139 extends from the apron on the inner side also and keyed to that portion of the shaft is a locking member 143 which has the appearance of a somewhat elongated finger having one end chamfered to fit the V-groove 138 and extending from the axis of the shaft 139 sufficiently to engage the V-groove when the handle 142 has rotated the shaft 139 to a proper position. Also fastened to the apron 127 is a shaft 144 which extends inwardly of the machine and passes through a passage in a portion of the base 11. Lying within this passage in the base 11 is a clamp member 145 which is provided with an aperture through which the shaft 144 passes. The clamping member 145 has a threaded shank 146 which extends at a right angle to the axis of the shaft 144 and extends outwardly of the base 11 where is it engaged by a nut member 147. The nut member 147 is provided with an angularly related actuating handle 148 by which it may be rotated.

Figures 13, 14:
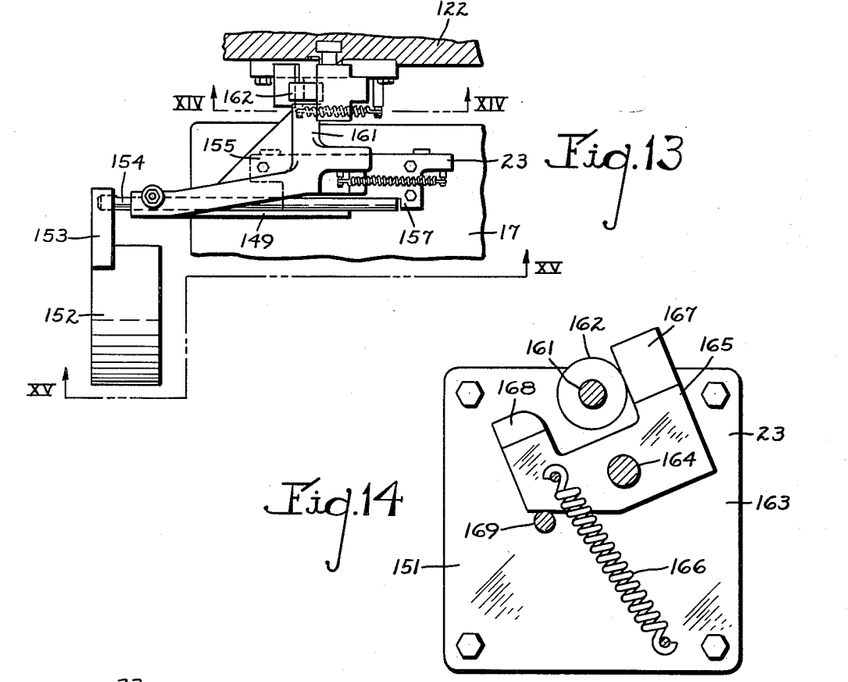
Fig. 13 is a plan view of a wheel guard for forming part of the invention.
Fig. 14 is a view of the invention taken on the line XIV—XIV of Fig. 13.
Figure 15:
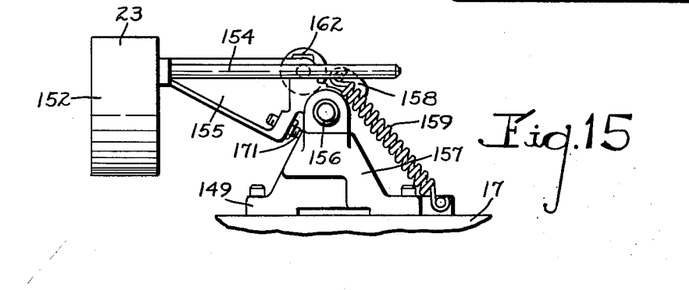
Fig. 15 is a view of the invention taken on the line XV—XV of Fig. 13.

Referring now to Figs. 13, 14 and 15, which best show the details of the wheel guard mechanism 23, it should be understood that the mechanism consists of a forward portion 149 which is shown by itself in Fig. 15 and which is attached to the top slide 17 and a rear portion 151 which is best shown in Fig. 14 and which is attached to the supporting column 122 extending upwardly from the rear of the base 11. The forward portion 149 consists of the wheel guard 152 which is a semi-circular shell having an abutment 153 extending rearwardly therefrom. Extending longitudinally of the machine from this abutment is a supporting rod 154 which is locked in a suitable passage in a swinging member 155. This swinging member is pivotally attached by means of a pivot pin 156 to the upper portion of a supporting base 157, which in turn is bolted to the top slide 17. Extending from the upper portion of the swinging member 155 in the direction opposite the supporting rod 154 is an arm 158 which is connected by a coil spring 159 to the base 157. Extending rearwardly from the swinging member 155 is an elongated hub 161, this hub being generally cylindrical and having its axis horizontal and transversely of the machine. At its outer end is pivotally attached a cam roller 162. The rear portion of the wheel guard mechanism is mounted on the column by means of a base member 163 having a pivot pin 164 extending therefrom. Mounted on the pivot pin is a cam member 165 which is connected to the base member 163 by means of a coil spring 166. Extending upwardly of the cam member is a pressure arm 167 located to one side of the pivot pin 164 and a secondary pressure arm 168 extending upwardly from the other side of the pivot pin 164; the coil spring 166 is attached to the cam member on the same side of the pivot pin 164 as the secondary pressure arm 168. A dowel 169 limits the movement of the cam member 165 in the direction to which it is urged by the coil spring 166. An adjustable stop screw 171 limits the movement of the swinging member 155 so that the guard 152 is located properly with respect to the wheel during its operative positioning.

Figure 16:
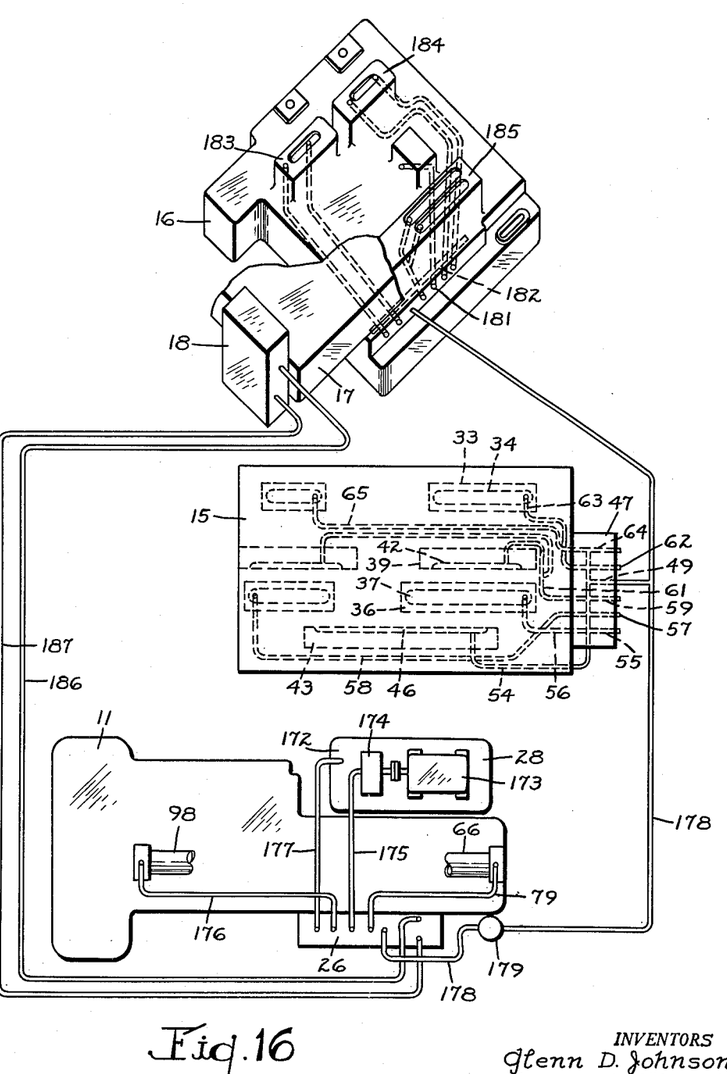
Fig. 16 is a somewhat schematic view of certain portion of the invention, showing particularly the hydraulic circuits.
Figure 17:
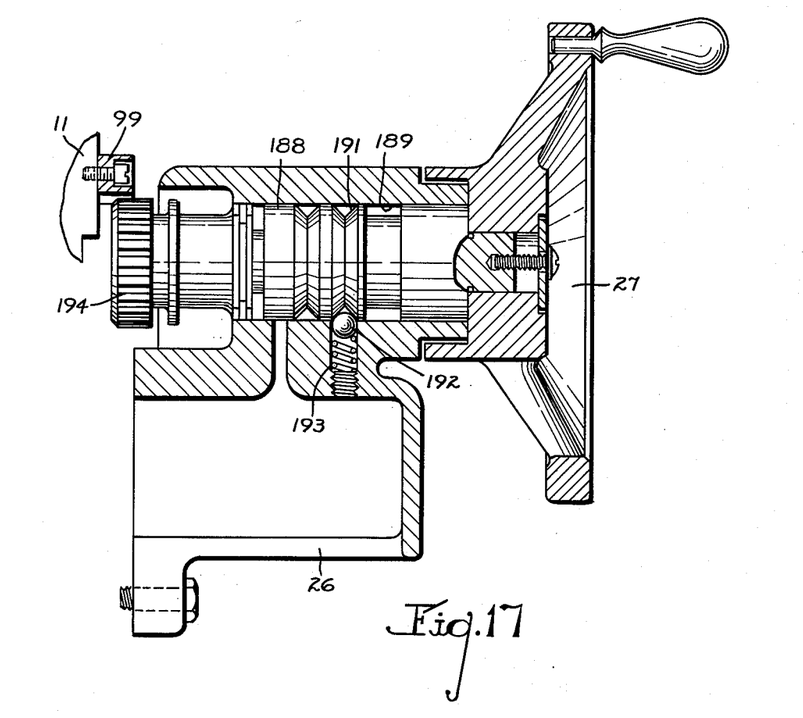
Fig. 17 is a sectional view of a portion of the invention taken on the line XVII—XVII of Fig. 7.

In Fig. 16 is shown the general hydraulic circuitry used in the machine, particularly with reference to the base 11, the wheelhead slide 15, the bottom slide 16, and the top slide 17. The hydraulic pressure unit 28, which is mounted at the rear of the base 11, consists of a sump 172 on the upper wall of which is mounted a motor 173 connected in driving relationship to a rotary hydraulic pump 174. The output of the pump 174 is connected by a conduit 175 to the valve box 26. The valving contained in the box 26 is not the subject of the present invention and is of the type conventional in such applications. A conduit 176 is attached to the valve box 26 and supplies pressure fluid to the hydraulic linear actuator 98. Now, a similar conduit 79 leaves the valve box 26 and supplies hydraulic fluid to the hydraulic linear actuator 66. A return line 177 connects the valve box to the sump 172. A conduit 178 leaves the valve box 26 and, after passing through a filter 179, supplies hydraulic fluid under pressure to the wheelhead table 15 and the bottom slide 16. The manner in which the conduit 178 is connected through the manifold block 47 to the pressure pads and pockets of the wheelhead slide 15 has been described in connection with Fig. 2. In a similar manner the conduit 178 is connected to a manifold block 181 associated with the bottom slide 16, the manifold block having a main bore 182 which is provided with passages and metering screws similar to those used in connection with the manifold block 47. The passages in turn are connected to pockets in oil pads 183, 184 and 185 by which the top slide 17 is mounted on the bottom slide 16 for transverse movement of the wheelhead 21 transversely of the machine. Conduits 186 and 187 extend from the valve box 26 to the feed box 18 which is mounted at the front of the top slide 17 and which serves to control the rate of feeding of the top slide 17 over the bottom slide 16 in feeding the wheel 22 into the work. Fig. 17 shows a section through the hand wheel 27 showing the manner in which it is connected to the rack 99 which, in turn, is bolted to the base 11. A shaft is provided in its intermediate portion with a groove 191 which is engaged by a detent ball 192 which is pressed toward the groove 191 by a coil spring 193. At its outer end the shaft 188 has a hand wheel 27 suitably fastened thereto, while at the inner end the shaft is provided with a pinion gear 194 which meshes with the rack 99.

The operation of the universal grinding machine of the invention will now be readily understood in view of the above description. Referring to Fig. 1, the wheelhead motor 19 rotates and in turn rotates the abrasive wheel 22. The workpiece is carried by the workhead 14 on a chuck located within the chuck guard 20. The workpiece is rotated by the workhead motor 24 with the chuck guard 20 in the closed position shown in Fig. 1. It should be noted that the chuck guard 20 is provided with two hinges so that the hinge point can be changed from an upper position to a lower position depending on the type of grinding being done. If angularity of the workpiece with respect to the axis of the wheel 22 is desired, the clamping bolts which engage the T-slot 124 can be loosened and the entire workhead rotated about the pivot aperture 123. Rotation can be accomplished by the engagement of a suitable adjusting worm with the rack 125 and the exact position can be located by means of the scale 126. Other more accurate methods of locating the axis of the work relative to the axis of the wheel are well known in the art and may also be used. In order to adjust the workpiece transversely of the machine it is necessary to make use of the hand wheel 128. Referring to Figs. 9 through 12, the actuating handle 148 is rotated to rotate the nut 147 and loosen the clamping member 145 on the rod 144. The actuating handle 142 is rotated to bring the locking member 143 into the V-groove 138. Then the hand wheel 128 is rotated, thus turning the screw member 129 until the workhead table 13 has been moved to the correct position. Then the actuating handle 148 is moved to rotate the nut 147 and clamp the clamping member 145 against the rod 144. This means that the rod 144 acting through the apron 127 has locked the table 13 relative to the base. However, the feed screw 129 is still under considerable compressive stress because of the load placed upon it in moving the table across the base. It is possible, therefore, in the operation of the machine that vibrations will cause the table to jump, thus relieving the stress in the screw 129 and introducing inaccuracy in the table position. In order to prevent such an event the table is locked relative to the base through the medium of the actuating handle 148 and the rod 144. Then, the stress is removed from the feed screw 129 by rotating the actuating handle 142 so that the locking member 143 moves out of the V-groove 138. The bushing 136 is then free to move in its bore 137 and does so, adjusting itself longitudinally so that all the stress is removed from the feed screw 129. It is left in this position during the operation of the machine. In order to perform surface grinding the workpiece is mounted in the workhead and the workhead is rotated 90° so that the surface to be finished faces the hand wheel 128. In this position the wheel 22 is passed over the surface with the radial surface of the wheel engaging the surface to be ground on the workpiece. However, when work which is being finished by internal grinding, external grinding, or surface grinding, it is necessary to reciprocate the wheel 22 relative to the surface to be ground. In order to do this, it is necessary to provide the minimum of friction between the wheelhead table 15 and the base 11. This is accomplished by hydrostatic lubrication. Referring to Fig. 16 the rotation of the motor 173 causes a similar rotation of the pump 174 and brings about the supply of pressure oil to the conduit 75 and to the valve box 26. By suitable actuation of the valving in the valve box 26 the oil is sent out to various parts of the machine. Oil is alternately sent out and received from the cylinders 66 and 98 which, being connected at their free ends to the wheelhead table 15, cause the reciprocation mentioned above. The hydrostatic pads are located on the under side of the wheelhead table 15 and they contact corresponding rails on the upper part of the base 11. The pressure oil to these pads passes through the conduit 178 into the manifold block 47 and into the main bore 48 thereof. When the oil passes through the passage 49 and similar passages, it leaves the main bore 48 on its way to the pipe socket 52. In doing so it must pass between the threads on the bore 49 and the threads on the metering screw 53. As is evident in Fig. 3, the further the metering screw is turned to introduce it into the part of the bore which lies between the main bore 48 and the pipe socket 52 the greater the friction of the oil against the surfaces of the threads. Adjustment of the metering screw 53 through the pipe socket 51, which opens at the rear exposed side of the manifold block 47, permits a very sensitive adjustment of the resistance in the metering screw and, therefore, of the pressure drop therethrough. The pressure drop as the oil passes the screw threads of the metering screws to the longitudinally-elongated oil cavities or pockets results in an oil reservoir at higher pressure ahead of the metering screws. Reduction of oil film thickness with an increase of load on the table is, therefore, immediately corrected by the higher pressure source. The self-compensating oil pressure pockets thus maintain constant clearance despite changing load conditions. Hydrostatic ways function in a similar manner in the wheelhead cross slide 16. As is evident in Fig. 2, the flat ways used in this machine require only a simple grinding technique to manufacture; this is in contrast with the dovetail ways used in old type machines which normally required hand scraping for proper fitting. The lateral position of the wheelhead table 15 relative to the base 11 is determined and fixed in place by the provision of opposed hydrostatic pockets 41 and 46 lying on opposite sides of the rail 29. As the reversing valve in the valve box 26 alternates the oil passing to the actuators 66 and 98, a reciprocation of the table 15 is brought about. Fig. 5 shows an enlarged view in section of the hydraulic linear actuator 66. When oil is introduced at the conduit 79 it passes through the bore 77 and presses the check ball 88 away from its seat so that oil flows through the passage 89 and radially outwardly through the passages 94. This causes movement of the table to the left and causes a return of oil from the actuator 98 to the sump 172. When the table is moved to the right, it does so under the flow of pressure oil to the hydraulic actuator 98. As the table approaches the right hand position, it is necessary to be sure that it does not do so with a shock which would disturb setting of the wheel. This is accomplished by means of the piston 81 which, when the linear actuator 66 is in the collapsed position shown in Fig. 6, contacts the cap 71. This drives the piston inwardly of the piston rod 66 against the pressure of the coil spring 92. Before the piston 81 struck the cap 71 oil passed freely through the passages 95 and 96 around the annular space between the annular groove 95 and the skirt of the piston and passed outwardly through the bore 77 and conduit 79 to the sump 72 by way of the valving in the valve box 26. However, when the piston 81 is pressed rearwardly in the piston rod, the skirt of the piston closes the annular space between the end of the piston and the annular groove 95 except for the small exposed area provided by the flat 97. Effectively, then, these elements of the linear actuator 66 dampen the movement at the end of the stroke because of the relatively small passage provided for the pumping of oil therefrom.

With reference to Fig. 7, it can be seen that the most of the machanism included therein is common to grinding machines of this type. The rotation of the hand wheel 27 causes the pinion gear 194 (see Fig. 17) to engage the rack 99 and move the wheelhead table 15 over the surface of the base 11. This is readily done with this simple mechanism because of the excellent anti-friction engagement between the table and the base. The adjustment of the table dogs 105 and 106 determine the length of the reciprocations of the wheelhead and the adjustment and rotation of the facing attachment 111 determines some of these factors also.

The manner in which the adjustment of the wheelhead motor 19 relative to the wheelhead is accomplished is readily shown in Fig. 8. By rotating the adjusting screw 117, it is possible to move the transition block 118 up and down the inclined surface 116 and, thus, raise and lower the motor 19. This is particularly useful for adjusting belt tension.

As the wheelhead reciprocates across the base 11, the wheel guard mechanism 23 is actuated to remove the guard from the wheel as the wheel enters the chuck guard 20. Every time the table reciprocates on an extended traverse to the right in Fig. 1 the wheel guard moves downwardly and covers the wheel, thus preventing accidents. Referring to Figs. 13, 14, and 15, it can be seen that the forward portion 149 moves with the wheelhead, while the rear portion 158, which is attached to the supporting column 122, remains fixed.

When the wheelhead moves to the left carrying the forward portion 149 with it, the coil spring 159 acts on the arm 158 to rotate the swinging member 155 about the pivot pin 156. This carries the rod 154 and the wheel guard 152 upwardly and away from the wheel. When the wheelhead moves to the right, however, so that the wheel is removed from the work, the cam roller 164 strikes the pressure arm 167 which forces the cam roller downwardly, thus rotating the swinging member 155 about the pivot pin 156 despite the coil spring 159 tending to rotate it in the opposite direction. The wheel guard 152, therefore, finally reaches the position shown in Fig. 15 covering the wheel, the ultimate position being determined by the stop screw 171. If, for any reason, it is necessary that the wheel guard does not come down into the guarding position (as might well happen, for instance, if the operator had his hand in the vicinity of the wheel) a contact of the wheel guard 152 with his hand or any other obstacle would produce sufficient pressure of the cam wheel 164 against the pressure arm 167 to cause the cam member 165 to rock in a clockwise manner in Fig. 14 about the pivot pin 164. This would be true, despite the pressure of the coil spring 166 tending to maintain the cam member in its position against the stop 169. As a matter of fact, if the operator presses upwardly on the wheel guard 152 and rotates it about the pivot pin 156 a sufficient distance, the cam member 165 will be rotated until the spring 166 goes into over-center position. Once the cam member 165 is snapped into this over-center position, it remains there and the secondary pressure member 168 acts on the cam roller 162 to hold the wheel guard 152 in this raised position. This retracted position would be necessary in case one were changing the wheel, for instance. Once this raised position has been reached, however, it takes positive action on the part of the operator to return the cam member 165 to its normal position for a normal operation of the guard mechanism.

It can be seen, then, that the use of the hydrostatically lubricated ways permitting a simplified base casting and the use of the very simple linear actuator construction will appreciably reduce the cost of this universal grinding machine. The economic design maintains high precision, however, for grinding straight or tapered bores, outside diameters, and convex and concave surfaces. The hydrostatic ways used in the machine table and the wheelhead cross slide eliminates two cost elements: first, it eliminates the booster pressure which is normally required in table cylinders, and it does away secondly with the scraping of the ways to provide oil pockets for lubricant. A constant oil thickness with changing loads permits the movement of the heavy wheelhead table assembly with only finger tip pressure. As has been shown above, the hydrostatic ways are simple in design. Machine oil pressure which would be normally at about 150 lbs. per sq. in. is fed to the manifold which contains the metering screws. The pressure drop as the oil passes the screw threads to the longitudinally-extending oil pockets results in an oil reservoir at higher back pressure ahead of the metering screws. Any reduction in oil film thickness with an increase in load on the table is immediately corrected at the higher pressure source. The self-compensating oil pressure pockets thus maintain constant clearance with changing load conditions. The hydrostatic ways function in a similar manner in the wheelhead cross slide. Cost is further reduced by the elimination of the necessity for accurately bored and honed pistons and cylinders; on the contrary, each actuator consists of a steel tube with a simple ground rod and a bronze bushing, which elements replace the normal double-acting cylinder and piston. The design eliminates piston rings and their incident maintenance. The compact arrangement permits table travel in both directions at constant speed. The dovetail ways normally used on machines of this type require hand scraping for proper fitting; the present design, however, employs flat ways in the workhead cross slide and wheelhead table and require only grinding. The compact valve arrangement, which features the outside mounting in a single valve box, minimizes core requirements in the base. A leakproof table control valve incorporates the pilot reverse and throttle functions within the single easily-accessible valve housing. The elimination of a valve sump by the leakproof design simplifies the base casting.

Other modes of applying the principles of the invention may be employed, change being made as regards the details described, provided the features stated in the following claims, or the equivalent of such, be employed.

The invention having been thus described, what is claimed as new and desired to secure by Letters Patent is:

1. A universal grinding machine, comprising a base, a workhead cross slide slidably mounted on the base for movement transversely of one end thereof, a workhead mounted on the cross-slide, a wheelhead table mounted on the base for sliding movement longitudinally thereof, a wheelhead cross-slide mounted on the table for transverse movement relative thereto, a wheelhead adapted to carry an abrasive wheel mounted on the wheel head cross-slide, a guard for the abrasive wheel, a mechanism for moving the guard from an operative position over the wheel to an inoperative position removed from the wheel, a mechanism having a front portion attached to the wheelhead cross-slide and a rear portion connected to the base, the front portion having a swinging arm to which the guard is attached with a cam follower extending therefrom, the rear portion having a cam member, contact between the cam follower and the cam member taking place when the wheel head table moves over the base, the said contact causing the guard to move from its inoperative to its operative position, and means to interrupt the said movement of the guard, if it strikes an intervening object, and to permit it to be movde and retain in its inoperative position.

2. A universal grinding machine, comprising a base, a workhead cross-slide slidably mounted on the base for movement transversely of one end thereof, a workhead mounted on the cross-slide, a wheelhead table mounted on the base for sliding movement longitudinally thereof, a wheelhead cross-slide mounted on the table for transverse movement relative thereto, a wheelhead adapted to carry an abrasive wheel mounted on the wheelhead cross-slide, longitudinally extending rails having flat horizontal upper surfaces formed on the base, flat horizontal surfaces with oil pockets formed on the under side of the said wheelhead table in position to lie parallel and adjacent to the surfaces of the rails, one rail having opposite vertical surfaces formed thereon, two opposed vertical surfaces with oil pockets formed on the under side of the wheelhead table, one of the last-named surfaces lying parallel and adjacent to each of the vertical surfaces of the rail, and means supplying pressure fluid to the oil pockets to provide for a hydrostatic film between the adjacent parallel surfaces.

3. A universal grinding machine, comprising a base, a workhead cross-slide slidably mounted on the base for movement transversely of one end thereof, a workhead mounted on the cross-slide, a wheelhead table mounted on the base for sliding movement longitudinally thereof, a wheelhead cross-slide mounted on the table for transverse movement relative thereto, a wheelhead adapted to carry an abrasive wheel mounted on the wheelhead cross-slide, vertical and horizontal surfaces formed on the base, vertical and horizontal surfaces formed on the under side of the wheelhead table, each of the last-named surfaces lying parallel and closely adjacent to a corresponding surface of the wheelhead table, means for supplying a hydrostatic film of lubricant between such adjacent surfaces, a rack attached to the wheelhead table, a transverse shaft carried by the base, a pinion gear mounted on one end of the shaft in position to engage the rack, and a hand wheel mounted on the other end of the shaft for rotating the shaft and bringing about longitudinal movement of the wheelhead table.

4. A universal grinding machine, comprising a base, a workhead cross-slide slidably mounted on the base for movement transversely of one end thereof, a workhead mounted on the cross-slide, a wheelhead table mounted on the base for sliding movement longitudinally thereof, a wheelhead cross-slide mounted on the table for transverse movement relative thereto, a wheelhead adapted to carry an abrasive wheel mounted on the wheelhead cross-slide, a feed screw mounted transversely of the workhead slide, a nut mounted on the base for engagement with the feed screw, means for selectively releasing the feed screw from the workhead slide, a transverse rod attached to the workhead slide, a clamp mounted on the base, and means for selectively fixing the clamp to the rod.

5. A universal grinding machine, comprising a base, a workhead cross-slide slidably mounted on the base for movement transversely of one end thereof, a workhead mounted on the cross-slide, a wheelhead table mounted on the base for sliding movement longitudinally thereof, a wheelhead cross-slide mounted on the table for transverse movement relative thereto, a wheelhead adapted to carry an abrasive wheel mounted on the wheelhead cross-slide, a pair of single-acting hydraulic linear actuators connecting the wheelhead table to the base to bring about the said longitudinal movement, each actuator consisting of a tubular body having a bushing at one end and a headless rod extending through the bushing, a passage extending axially through the rod for supplying pressure fluid to the interior of the body, at least one of the actuators having a damper formed therein to resist movement of the rod in the body at the end of a stroke.

6. A universal grinding machine, comprising a base, a workhead cross-slide slidably mounted on the base for movement transversely of one end thereof, a workhead mounted on the cross-slide, a wheelhead table mounted on the base for sliding movement longitudinally thereof, a wheelhead cross-slide mounted on the table for transverse movement relative thereto, a wheelhead adapted to carry an abrasive wheel mounted on the wheelhead cross-slide, parallel longitudinal rails on the base having flat horizontal surfaces formed thereon, pads formed on the under side of the wheelhead table having flat horizontal surfaces lying parallel and adjacent to the rails, shallow oil pockets formed in the pads, a hydraulic circuit supplying fluid under pressure to the pockets, the circuit including a passage leading to each pocket, a portion of each passage being formed with threads, a metering screw extending into the said portion, the said screw being movable in and out of the said portion by rotation thereof to permit an adjustment of the amount that the screw lies within the portion in order to adjust the resistance to flow of oil through the passage, one rail having opposite vertical surfaces formed thereon, two opposed vertical surfaces with oil pockets formed on the upper side of the wheelhead table, one of the last-named surfaces lying parallel and adjacent to each of the vertical surfaces of the rail, and means supplying pressure fluid to the oil pockets to provide for a hydrostatic film between the adjacent parallel surfaces.

7. A universal grinding machine, comprising a base, a wheelhead cross-slide slidably mounted on the base for movement transversely of one end thereof, a workhead mounted on the cross-slide, a wheelhead table mounted on the base for sliding movement longitudinally thereof, a wheelhead cross-slide mounted on the table for transverse movement relative thereto, a wheelhead adapted to carry an abrasive wheel mounted on the wheelhead cross-slide, longitudinally extending rails having flat horizontal upper surfaces formed on the base, flat horizontal surfaces with oil pockets formed on the under side of the said wheelhead table in position to lie parallel and adjacent to the surfaces of the rails, one rail having opposite vertical surfaces formed thereon, two opposed vertical surfaces with oil pockets formed on the under side of the wheelhead table, one of the last-named surfaces lying parallel and adjacent to each of the vertical surfaces of the rail, and means supplying pressure fluid to the oil pockets to provide for a hydrostatic film between the adjacent parallel surfaces, a rack attached to the wheelhead table, a transverse shaft carried by the base, a pinion gear mounted on one end of the shaft in position to engage the rack, and the hand wheel mounted on the other end of the shaft for rotating the shaft and bringing about longitudinal movement of the wheelhead table.

8. A universal grinding machine, comprising a base, a workhead cross-slide slidably mounted on the base for movement transversely of one end thereof, a workhead mounted on the cross-slide, a wheelhead table mounted on the base for sliding movement longitudinally thereof, a wheelhead cross-slide mounted on the table for transverse movement relative thereto, a wheelhead adapted to carry an abrasive wheel mounted on the wheelhead cross-slide, parallel longitudinal rails on the base having flat horizontal surfaces formed thereon, pads formed on the under side of the wheelhead table having flat horizontal surfaces lying parallel and adjacent to the rails, shallow oil pockets formed in the pads, a hydraulic circuit supplying fluid under pressure to the pockets, a circuit including a passage leading to each pocket, a portion of each pocket beng formed with threads, a metering screw extending into the said portion, the said screw being movable in and out of the said portion by rotation thereof to permit an adjustment of the amount that the screw lies within the portion in order to adjust the resistance to flow of oil through the passage, one rail having opposite vertical surfaces formed thereon, two opposed vertical surfaces with oil pockets formed on the under side of the wheelhead table, one of the last-named surfaces lying parallel and adjacent to each of the vertical surfaces of the rail, a rack attached to the wheelhead table, a transverse shaft carried by the base, a pinion gear mounted on one end of the shaft and positioned to engage the rack, and a hand wheel mounted on the other end of the shaft for rotating the shaft and bringing about longitudinal movement of the wheelhead table.

9. A universal grinding machine, comprising a base, a workhead cross-slide slidably mounted on the base for movement transversely of one end thereof, a workhead mounted on the cross-slide, a wheelhead table mounted on the base for sliding movement longitudinally thereof, a wheelhead cross-slide mounted on the table for transverse movement relative thereto, a wheelhead adapted to carry an abrasive wheel mounted on the wheelhead cross-slide, parallel longitudinal rails on the base having flat horizontal surfaces formed thereon, pads formed on the under side of the wheelhead table having flat horizontal surfaces lying parallel and adjacent to the rails, shallow oil pockets formed in the pads, a hydraulic circuit supplying fluid under pressure to the pockets, the circuit including a passage leading to each pocket, a portion of each passage being formed with threads, a metering screw extending into the said portion, the said screw being movable in and out of the said portion by rotation thereof to permit an adjustment of the amount that the screw lies within the portion in order to adjust the resistance to flow of oil through the passage, a pair of single-acting hydraulic linear actuators connecting the wheelhead table to the base to bring about the said longitudinal movement, each actuator consisting of a tubular body having a bushing at one end and a headless rod extending through the bushing, a passage extending axially through the rod for supplying pressure fluid to the interior of the body, at least one of the actuators having a damper formed therein to resist movement of the rod in the body at the end of a stroke.

10. A universal grinding machine, comprising a base, a workhead cross-slide slidably mounted on the base for movement transversely of one end thereof, a workhead mounted on the cross-slide, a wheelhead table mounted on the base for sliding movement longitudinally thereof, a wheelhead cross-slide mounted on the table for transverse movement relative thereto, a wheelhead adapted to carry an abrasive wheel mounted on the wheelhead cross-slide, longitudinally extending rails having flat horizontal upper surfaces formed on the base, flat horizontal surfaces with oil pockets formed on the under side of the said wheelhead table in position to lie parallel and adjacent to the surfaces of the rails, one rail having opposite vertical surfaces formed thereon, two opposed vertical surfaces with oil pockets formed on the under side of the wheelhead table, one of the last-named surfaces lying parallel and adjacent to each of the vertical surfaces of the rail, and means supplying pressure fluid to the oil pockets to provide for hydrostatic film between the adjacent parallel surfaces, a pair of single-acting hydraulic linear actuators connecting the wheelhead table to the base to bring about the said longitudinal movement, each actuator consisting of a tubular body having a bushing at one end and a headless rod extending through the bushing, a passage extending axially through the rod for supplying pressure fluid to the interior of the body, at least one of the actuators having a damper formed therein to resist movement of the rod in the body at the end of a stroke.

11. A universal grinding machine, comprising a base, a workhead cross-slide slidably mounted on the base for movement transversely of one end thereof, a workhead mounted on the cross-slide, a wheelhead table mounted on the base for sliding movement longitudinally thereof, a wheelhead cross-slide mounted on the table for transverse movement relative thereto, a wheelhead adapted to carry an abrasive wheel mounted on the wheelhead cross-slide, vertical and horizontal surfaces formed on the base, vertical and horizontal surfaces formed on the under side of the wheelhead table, each of the last-named surfaces lying parallel and closely adjacent to a corresponding surface of the wheelhead table, means for supplying a hydrostatic film of lubricant between such adjacent surfaces, a rack attached to the wheelhead table, a transverse shaft carried by the base, a pinion gear mounted on one end of the shaft in position to engage the rack, a hand wheel mounted on the other end of the shaft for rotating the shaft and bringing about longitudinal movement of the wheelhead table, a pair of single-acting hydraulic linear actuators connecting the wheelhead table to the base to bring about the said longitudinal movement, each actuator consisting of a tubular body having a bushing at one end and a headless rod extending through the bushing, a passage extending axially through the rod for supplying pressure fluid to the interior of the body, at least one of the actuators having a damper formed therein to resist movement of the rod in the body at the end of a stroke.

12. A universal grinding machine, comprising a base, a workhead cross-slide slidably mounted on the base for movement transversely of one end thereof, a workhead mounted on the cross-slide, a wheelhead table mounted on the base for sliding movement longitudinally thereof, a wheelhead cross-slide mounted on the table for transverse movement relative thereto, a wheelhead adapted to carry an abrasive wheel mounted on the wheelhead cross-slide, parallel longitudinal rails on the base having flat horizontal surfaces formed thereon, pads formed on the under side of the wheelhead table having flat horizontal surfaces lying parallel and adjacent to the rails, shallow oil pockets formed in the pads, a hydraulic circuit supplying fluid under pressure to the pockets, the circuit including a passage leading to each pocket, a portion of each passage being formed with threads, a metering screw extending into the said portion, the said screw being movable in and out of the said portion by rotation thereof to permit an adjustment of the amount that the screw lies within the portion in order to adjust the resistance to flow of oil through the passage, one rail having opposite vertical surfaces formed thereon, two opposed vertical surfaces with oil pockets formed on the under side of the wheelhead table, one of the last-named surfaces lying parallel and adjacent to each of the vertical surfaces of the rail, and means supplying pressure fluid to the oil pockets to provide for a hydrostatic film between the adjacent parallel surfaces, a rack attached to the wheelhead table, a transverse shaft carried by the base, a pinion gear mounted on one end of the shaft in position to engage the rack, and a hand wheel mounted on the other end of the shaft for rotating the shaft and bringing about longitudinal movement of the wheelhead table, a pair of single-acting hydraulic linear actuators connecting the wheelhead table to the base to bring about the said longitudinal movement, each actuator consisting of a tubular body having a bushing at one end and a headless rod extending through the bushing, a passage extending axially through the rod for supplying pressure fluid to the interior of the body, at least one of the actuators having a damper formed therein to resist movement of the rod in the body at the end of a stroke.

13. A universal grinding machine, comprising a base, a workhead cross-slide slidably mounted on the base for movement transversely of one end thereof, a workhead mounted on the cross-slide, a wheelhead table mounted on the base for sliding movement longitudinally thereof, a wheelhead cross-slide mounted on the table for transverse movement relative thereto, a wheelhead adapted to carry an abrasive wheel mounted on the wheelhead cross-slide, longitudinally extending rails having flat horizontal upper surfaces formed on the base, flat horizontal surfaces with oil pockets formed on the under side of the said wheelhead table in position to lie parallel and adjacent to the surfaces of the rails, one rail having opposite vertical surfaces formed thereon, two opposed vertical surfaces with oil pockets formed on the under side of the wheelhead table, one of the last-named surfaces lying parallel and adjacent to each of the vertical surfaces of the rail, and means supplying pressure fluid to the oil pockets to provide for a hydrostatic film between the adjacent parallel surfaces, a hydraulic circuit for supplying pressure fluid to the elements of the machine, a valve box mounted on the front of the machine, a plurality of valves mounted in the box for controlling the flow of fluid in the said hydraulic circuit, the actuating elements of the valve protruding from the box for the operation thereof.

14. A universal grinding machine, comprising a base, a workhead cross-slide slidably mounted on the base for movement transversely of one end thereof, a workhead mounted on the cross-slide, a wheelhead table mounted on the base for sliding movement longitudinally thereof, a wheelhead cross-slide mounted on the table for transverse movement relative thereto, a wheelhead adapted to carry an abrasive wheel mounted on the wheelhead cross-slide, vertical and horizontal surfaces formed on the base, vertical and horizontal surfaces formed on the under side of the wheelhead table, each of the last-named surfaces lying parallel and closely adjacent to a corresponding surface of the wheelhead table, means for supplying a hydrostatic film of lubricant between such adjacent surfaces, a rack attached to the wheelhead table, a transverse shaft carried by the base, a pinion gear mounted on one end of the shaft in position to engage the rack, a hand wheel mounted on the other end of the shaft for rotating the shaft and bringing about longitudinal movement of the wheelhead table, a hydraulic circuit for supplying pressure fluid to the elements of the machine, a valve box mounted on the front of the machine, a plurality of valves mounted in the box for controlling the flow of fluid in the said hydraulic circuit, the actuating elements of the valves protruding from the box for the operation thereof.

15. A universal grinding machine, comprising a base, a workhead closs-slide slidably mounted on the base for movement transversely of one end thereof, a workhead mounted on the cross-slide, a wheelhead table mounted on the base for sliding movement longitudinally thereof, a wheelhead cross-slide mounted on the table for transverse movement relative thereto, a wheelhead adapted to carry an abrasive wheel mounted on the wheelhead cross-slide, a pair of single-acting hydraulic linear actuators connecting the wheelhead table to the base to bring about the said longitudinal movement, each actuator consisting of a tubular body having a bushing at one end and a headless rod extending through the bushing, a passage extending axially through the rod for supplying pressure fluid to the interior of the body, at least one of the actuators having a damper formed therein to resist movement of the rod in the body at the end of a stroke, a hydraulic circuit for supplying pressure fluid to the elements of the machine, a valve box mounted on the front of the machine, a plurality of valves mounted in the box for controlling the flow of fluid in the said hydraulic circuit, the actuating elements of the valves protruding from the box for the operation thereof.

16. A universal grinding machine, comprising a base, a workhead cross-slide slidably mounted on the base for movement transversely of one end thereof, a workhead mounted on the cross-slide, a wheelhead table mounted on the base for sliding movement longitudinally thereof, a wheelhead cross-slide mounted on the table for transverse movement relative thereto, a wheelhead adapted to carry an abrasive wheel mounted on the wheelhead cross slide, parallel longitudinal rails on the base having flat horizontal surfaces formed thereon, pads formed on the under side of the wheelhead table and having flat hroizontal surfaces lying parallel and adjacent to the rails, shallow oil pockets formed in the pads, a hydraulic circuit supplying fluid under pressure to the pockets, the circuit including a passage leading to each pocket, a portion of each passage being formed with threads, a metering screw extending into the said portion, the said screw being movable in and out of the said portion by rotation thereof to permit an adjustment of the amount that the screw lies within the portion in order to adjust the resistance to flow of oil through the passage, one rail having opposite vertical surfaces formed thereon, two opposed vertical surfaces with oil pockets formed on the under side of the wheelhead table, one of the last-named surfaces lying parallel and adjacent to each of the vertical surfaces of the rail, and means supplying pressure fluid to the oil pockets to provide for a hydrostatic film between the adjacent parallel surfaces, a rack attached to the wheelhead table, a transverse shaft carried by the base, a pinion gear mounted on one end of the shaft in position to engage the rack, and a hand wheel mounted on the other end of the shaft for rotating the shaft and bringing about longitudinal movement of the wheelhead table, a pair of single-acting hydraulic linear actuators connecting the wheelhead table to the base to bring about the said longitudinal movement, each actuator consisting of a tubular body having a bushing at one end and a headless rod extending through the bushing, a passage extending axially through the rod for supplying pressure fluid to the interior of the body, at least one of the actuators having a damper formed therein to resist movement of the rod in the body at the end of a stroke, a hydraulic circuit for supplying pressure fluid to the elements of the machine, a valve box mounted on the front of the machine, a plurality of valves mounted in the box for controlling the flow of fluid in the said hydraulic circuit, the actuating elements of the valves protruding from the box for the operation thereof.

17. A universal grinding machine, comprising a base, a workhead cross-slide slidably mounted on the base for movement transversely of one end thereof, a workhead mounted on the cross-slide, a wheelhead table mounted on the base for sliding movement longitudinally thereof, a wheelhead cross-slide mounted on the table for transverse movement relative thereto, a wheelhead adapted to carry an abrasive wheel mounted on the wheelhead cross-slide, a guard for the abrasive wheel, a mechanism for moving the guard from an operative position over the wheel to an inoperative position and removed from the wheel, the mechanism having a front portion attached to the wheelhead cross-slide and a rear portion connected to the base, the front portion having a swinging arm to which the guard is attached with a cam follower extending therefrom, the rear portion having a cam member, contact between the cam follower and the cam member taking place when the wheelhead table moves over the base, the said contact causing the guard to move from its inoperative to its operative position, and means to interrupt the said movement of the guard if it strikes an intervening object and to permit it to be moved and retained in its inoperative position, a pair of single-acting hydraulic linear actuators connecting the wheelhead table to the base to bring about the said longitudinal movement, each actuator consisting of a tubular body having a bushing at one end and a headless rod extending through the bushing, a passage extending axially through the rod for supplying pressure fluid to the interior of the body, at least one of the actuators having a damper formed therein to resist movement of the rod in the body at the end of a cycle.

18. A universal grinding machine, comprising a base, a workhead cross-slide slidably mounted on the base for movement transversely of one end thereof, a workhead mounted on the cross-slide, a wheelhead table mounted on the base for sliding movement longitudinally thereof, a wheelhead cross-slide mounted on the table for transverse movement relative thereto, a wheelhead adapted to carry an abrasive wheel mounted on the wheelhead cross-slide, a guard for the abrasive wheel, a mechanism for moving the guard from an operative position over the wheel to an inoperative position removed from the wheel, the mechanism having a flat portion attached to the wheelhead cross-slide and a rear portion connected to the base, the front portion having a swinging arm to which the guard is attached with a cam follower extending therefrom, the rear portion having a cam member, contact between the cam follower and the cam member taking place when the wheelhead table moves over the base, the said contact causing the guard to move from its inoperative position to its operative position, and means to interrupt the said movement of the guard if it strikes an intervening object and to permit it to be moved and retained in its inoperative position, parallel longitudinal rails on the base having flat horizontal surfaces formed thereon, pads formed on the under side of the wheelhead table having flat horizontal surfaces lying parallel and adjacent to the rails, shallow air oil pockets formed in the pads, a hydraulic circuit supplying fluid under pressure to the pockets, the circuit including a passage leading to each pocket, a portion of each passage being formed with threads, a metering screw extending into the said portion, the said screw being movable in and out of the said portion by rotation thereof to permit an adjustment of the amount that the screw lies within the portion in order to adjust the resistance to flow of oil through the passage, one rail having opposite vertical surfaces formed thereon, two opposed vertical surfaces with oil pockets formed on the under side of the wheelhead table, one of the last-named surfaces lying parallel and adjacent to each of the vertical surfaces of the rail, and means supplying pressure fluid to the oil pockets to provide for a hydrostatic film between the adjacent parallel surfaces, a rack attached to the wheelhead table, a transverse shaft carried by the base, a pinion gear mounted on one end of the shaft in position to engage the rack, a hand wheel mounted on the other end of the shaft for rotating the shaft and bringing about longitudinal movement of the wheelhead table, a pair of single-acting hydraulic linear actuators connecting the wheelhead table to the base to bring about the said longitudinal movement, each actuator consisting of a tubular body having a bushing at one end and a headless rod extending through the bushing, a passage extending axially through the rod for supplying pressure fluid to the interior of the body, at least one of the actuators having a damper formed therein to resist movement of the rod in the body at the end of the stroke.

19. A universal grinding machine, comprising a base, a workhead cross-slide slidably mounted on the base for movement transversely of one end thereof, a workhead mounted on the cross-slide, a wheelhead table mounted on the base for sliding movement longitudinally thereof, a wheelhead cross-slide mounted on the table for transverse movement relative thereto, a wheelhead adapted to carry an abrasive wheel mounted on the wheelhead cross-slide, a guard for the abrasive wheel, a mechanism for moving the guard from an operative position over the wheel to an inoperative position and removed from the wheel, the mechanism having a front portion attached to the wheelhead cross-slide and the rear portion connected to the base, the front portion having a swinging arm to which the guard is attached with a cam follower extending therefrom, the rear portion having a cam member, contact between the cam follower and the cam member taking place when the wheelhead table moves over the base, the said contact causing the guard to move from its inoperative position to its operative position, and means to interrupt the said movement of the guard if it strikes an intervening object and to permit it to be moved and retained in its inoperative position, a feed screw mounted transversely on the workhead slide, a nut mounted on the base for engagement with the feed screw, means for selectively releasing the feed screw from the workhead slide, a transverse rod attached to the workhead slide, a clamp mounted on the base, and means for selectively fixing the clamp to the rod.

20. A universal grinding machine, comprising a base, a workhead cross-slide slidably mounted on the base for movement transversely of one end thereof, a workhead mounted on the cross-slide, a wheelhead table mounted on the base for sliding movement longitudinally thereof, a wheelhead cross-slide mounted on the table for transverse movement relative thereto, a wheelhead adapted to carry an abrasive wheel mounted on the workhead cross-slide, a guard for the abrasive wheel, a mechanism for moving the guard from an operative position over the wheel to an inoperative position and removed from the wheel, the mechanism having a front portion attached to the wheelhead cross-slide and a rear portion connected to the base, the front portion having a swinging arm to which the guard is attached with a cam follower extending therefrom, the rear portion having a cam member, contact between the cam follower and the cam member taking place when the wheelhead table moves over the base, the said contact causing the guard to move from its operative to its inoperative position, and means to interrupt the said movement of the guard if it strikes an intervening object and to permit it to be moved and retained in its inoperative position, a feed screw mounted transversely on the workhead slide, a nut mounted on the base for engagement with the feed screw, means for selectively releasing the feed screw from the workhead slide, a transverse rod attached to the workhead slide, a clamp mounted on the base, and means for selectively fixing the clamp through the rod, a pair of single-acting hydraulic linear actuators connecting the wheelhead table to the base to bring about the said longitudinal movement, each actuator consisting of a tubular body having a bushing at one end and a headless rod extending through the bushing, a passage extending axially through the rod for supplying pressure fluid to the interior of the body, at least one of the actuators having a damper formed therein to resist movement of the rod in the body at the end of a stroke.

21. A universal grinding machine, comprising a base, a workhead cross-slide slidably mounted on the base for movement transversely of one end thereof, a workhead mounted on the cross-slide, a wheelhead table mounted on the base for sliding movement longitudinally thereof, a wheelhead cross-slide mounted on the table for transverse movement relative thereto, a wheelhead adapted to carry an abrasive wheel mounted on the wheelhead cross-slide, a guard for the abrasive wheel, a mechanism for moving the guard from an operative position over the wheel to an inoperative position removed from the wheel, a mechanism having a front portion attached to the wheelhead cross-slide and the rear portion connected to the base, the front portion having a swinging arm to which the guard is attached with a cam follower extending therefrom, the rear portion having a cam member, contacts between the cam follower and the cam member taking place when the wheelhead table moves over the base, the said contact causing the guard to move from its inoperative to its operative position, and means to interrupt the said movement of the guard if it strikes an intervening object and to permit it to be moved and retained in its inoperative position, vertical and horizontal surfaces formed on the base, vertical and horizontal surfaces formed on the underside of the wheelhead table, each of the last-named surfaces lying parallel and closely adjacent to a corresponding surface of the wheelhead table, means for supplying a hydrostatic film of lubricant between such adjacent surfaces, the said means including a hydraulic circuit and including a passage leading to each pocket, a portion of each passage being formed with threads, a metering screw extending into the said portion, the said screw being movable in and out of the said portion by rotation thereof to permit an adjustment of the amount that the screw lies within the portion in order to adjust the resistance to flow of oil through the passage, a rack attached to the wheelhead table, a transverse shaft carried by the base, a pinion gear mounted on one end of the shaft and in position to engage the rack and a hand wheel mounted on the other end of the shaft for rotating the shaft and bringing about longitudinal movement of the wheelhead table, a pair of single-acting hydraulic linear actuators connecting the wheelhead table to the base to bring about the said longitudinal movement, each actuator consisting of a tubular body having a bushing at one end and a headless rod extending through the bushing, a passage extending axially through the rod for supplying pressure fluid to the interior of the body, at least one of the actuators having a damper formed therein to resist movement of the rod in the body at the end of a stroke, a hydraulic circuit for supplying pressure fluid to the elements of the machine, a valve box mounted on the front of the machine, a plurality of valves mounted in the box for controlling the flow of fluid in the said hydraulic circuit, the actuating elements of the valves protruding from the box for the operation thereof.

22. A universal grinding machine, comprising a base, a workhead cross-slide slidably mounted on the base for movement transversely of one end thereof, a workhead mounted on the cross-slide, a wheelhead table mounted on the base for sliding movement longitudinally thereof, a wheelhead cross-slide mounted on the table for transverse movement relative thereto, a wheelhead adapted to carry an abrasive wheel mounted on the wheelhead cross-slide, vertical and horizontal surfaces formed on the base, vertical and horizontal surfaces formed on the underside of the wheelhead table, each of the last-named surfaces lying parallel and closely adjacent to a corresponding surface of the wheelhead table, means for supplying a hydrostatic film of lubricant between such adjacent surfaces, a rack attached to the wheelhead table, a transverse shaft carried by the base, a pinion gear mounted on one end of the shaft in position to engage the rack and a hand wheel mounted on the other end of the shaft for rotating the shaft and bringing about longitudinal movement of the wheelhead table, means for supplying a hydrostatic film including a passage leading to each pocket, a portion of each passage being formed with threads, a metering screw extending into the said portion, the said screw being movable in and out of the said portion by rotation thereof to permit an adjustment of the amount that the screw lies within the portion in order to adjust the resistance to flow of oil through the passage, a feed screw mounted transversely on the workhead slide, a nut mounted on the base for engagement with the feed screw, means for selectively releasing the feed screw from the workhead slide, a transverse rod attached to the workhead slide, a clamp mounted on the base, and means for selectively fixing the clamp to the rod, a pair of single-acting hydraulic linear actuators connecting the wheelhead table to the base to bring about the said longitudinal movement, each actuator consisting of a tubular body having a bushing at one end and a headless rod extending through the bushing, a passage extending axially through the rod for supplying pressure fluid to the interior of the body, at least one of the actuators having a damper formed therein to resist movement of the rod in the body at the end of a stroke, a hydraulic circuit for supplying pressure fluid to the elements of the machine, a valve box mounted on the front of the machine, a plurality of valves mounted in the box for controlling the flow of fluid in the said hydraulic circuit, the actuating elements of the valve protruding from the box for the operation thereof.

23. A universal grinding machine, comprising a base, a workhead cross-slide slidably mounted on the base for movement transversely of one end thereof, a workhead mounted on the cross-slide, a wheelhead table mounted on the base for sliding movement longitudinally thereof, a wheelhead cross-slide mounted on the table for transverse movement relative thereto, a wheelhead adapted to carry an abrasive wheel mounted on the wheelhead cross-slide, a guard for the abrasive wheel, a mechanism for moving the guard from an operative position over the wheel to an inoperative position and removed from the wheel, the mechanism having a front portion attached to the wheelhead cross-slide and a rear portion connected to the base, the front portion having a swinging arm to which the guard is attached with a cam follower extending therefrom, the rear portion having a cam member, contact between the cam follower and the cam member taking place when the wheelhead table moves over the base, the said contact causing the guard to move from its inoperative to its operative position, and means to interrupt the said movement of the guard if it strikes an intervening object, and to permit it to be moved and retained in its inoperative position, parallel longitudinal rails on the base having flat horizontal surfaces formed thereon, pads formed on the under side of the wheelhead table having flat horizontal surfaces lying parallel and adjacent to the rails, shallow oil pockets formed in the pads, a hydraulic circuit supplying fluid under pressure to the pockets, a circuit including a passage leading to each pocket, a portion of each passage being formed with threads, a metering screw extending into the said portion, the said screw being movable in and out of the said portion by rotation thereof to permit an adjustment of the amount the screw lies within the portion in order to adjust the resistance to flow of oil through the passage, one rail having opposite vertical surfaces formed thereon, two opposed vertical surfaces with oil pockets formed on the under side of the wheelhead table, one of the last-named surfaces lying parallel and adjacent to each of the vertical surfaces of the rail, a rack attached to the wheelhead table, a transverse shaft carried by the base, a pinion gear mounted on one end of the shaft in position to engage the rack, and a hand wheel mounted on the other end of the shaft for rotating the shaft and bringing about longitudinal movement of the wheelhead table, a feed screw mounted transversely on the workhead slide, a nut mounted on the base for engagement with the feed screw, means for selectively releasing the feed screw from the workhead slide, a transverse rod attached to the workhead slide, a clamp mounted on the base, and means for selectively fixing the clamp to the rod, a pair of single-acting hydraulic linear actuators connecting the wheelhead table to the base to bring about the said longitudinal movement, each actuator consisting of a tubular body having a bushing at one end and a headless rod extending through the bushing, a passage extending axially through the rod for supplying pressure fluid to the interior of the body, at least one of the actuators having a damper formed therein to resist movement of the rod in the body at the end of a stroke, a hydraulic circuit for supplying pressure fluid to the elements of the machine, a valve box mounted on the front of the machine, a plurality of valves mounted in the box for controlling the flow of fluid in the said hydraulic circuit, the actuating elements of the valves protruding from the box for the operation thereof.

References Cited in the file of this patent

UNITED STATES PATENTS

| | | |
|---|---|---|
| 1,805,056 | Taylor | May 12, 1931 |
| 2,021,066 | Huxford et al. | Nov. 12, 1935 |
| 2,032,269 | Einstein et al. | Feb. 25, 1936 |
| 2,127,877 | Maglott | Aug. 23, 1938 |
| 2,410,038 | Arms et al. | Oct. 29, 1946 |